(12) United States Patent
Glick

(10) Patent No.: US 6,507,563 B1
(45) Date of Patent: Jan. 14, 2003

(54) METHODS AND APPARATUS FOR CONTROLLING CONGESTION WITHIN DIVERSE PROTOCOL STACKS

(75) Inventor: Gilbert D. Glick, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/220,321

(22) Filed: Dec. 24, 1998

(51) Int. Cl.[7] .................................................. H04J 3/22
(52) U.S. Cl. ..................... 370/236; 370/469; 709/235
(58) Field of Search ................................ 370/229, 230, 370/235, 236, 401, 412, 428, 429, 463, 464, 465, 466, 467, 469; 709/223, 224, 225, 230, 231, 232, 235, 238

(56) References Cited

U.S. PATENT DOCUMENTS

| | | | | |
|---|---|---|---|---|
| 5,784,559 A | * | 7/1998 | Frazier et al. ............... | 370/229 |
| 6,097,697 A | * | 8/2000 | Yao et al. .................... | 370/230 |
| 6,097,731 A | * | 8/2000 | Aoki ........................... | 370/465 |
| 6,160,793 A | * | 12/2000 | Ghani et al. ................. | 370/236 |
| 6,233,224 B1 | * | 5/2001 | Yamashita et al. .......... | 370/231 |
| 6,273,622 B1 | * | 8/2001 | Ben-David ............... | 395/200.6 |

* cited by examiner

*Primary Examiner*—Ricky Ngo
(74) *Attorney, Agent, or Firm*—Beyer, Weaver & Thomas, LLP.; Mary R. Olynick, Esq.

(57) ABSTRACT

Disclosed is a method for transmitting a packet from a data queue through a protocol stack. The protocol stack is associated with one or more linked data structures. Each data structure indicates whether an associated protocol context is congested and is associated with a next data structure. It is determined whether a current protocol context in the protocol stack is congested by reference to an associated current data structure. If it is determined that the current protocol context is congested, the packet is held within the data queue. If it is determined that the current protocol context is not congested, it is determined whether there is a next data structure. If it is determined that there is not a next data structure, the packet is transmitted through the protocol stack.

40 Claims, 6 Drawing Sheets

METHODS AND APPARATUS FOR CONTROLLING CONGESTION WITHIN DIVERSE PROTOCOL STACKS

BACKGROUND OF THE INVENTION

The present invention relates generally to mechanisms and methods for routing data packets between nodes within a network. More specifically, the present invention relates to methods and apparatus for routing data packets from a data queue through a protocol stack.

FIG. 1 is a diagrammatic representation of a conventional network configuration 100. As shown, data packets 104 are held within a plurality of data queues 102. For example, data packets 104a, 104b, and 104c are held within a first data queue, data packet 104d is held within a second data queue, data packet 104e is held within a third data queue, etc.

As shown, there are various types of data that go to the different data queues 102. For example, internet protocol (IP) data 10 goes to a first data queue and a second data queue; packet assembler disassembler (PAD) data 12 goes to another data queue; qualified logical link control (QLLC) data 14 goes to yet another data queue; and data link switching (DLSW) data 16 goes to yet another data queue.

The network configuration 100 also includes a plurality of diverse protocol stacks through which the data or data packets will be transmitted, and each protocol stack has one or more associated protocol levels (also referred to as protocol layers or contexts). In other words, each data packet is associated with one of the protocol stacks and will eventually be sent through the associated protocol stack. For example, a data packet 104e will be transmitted through an associated protocol stack that includes a virtual circuit (VC) protocol layer 112b, an X.25 protocol layer 110, a link logic control (LLC2) protocol layer 108a, and a physical protocol layer 106 associated with a hardware device (not shown). The hardware device is coupled to other hardware devices (not shown) of other network nodes (not show), such as another router or end destination.

The term protocol is defined as any type of information format that is used to communicate between any independent entities, such as two network nodes.

Each data queue is associated with one or more protocols (herein referred to as a "protocol stack"), and these particular associations depend on the requirements of the particular application being implemented. For example, Internet Protocol data packets are transmitted directly from a data queue to the physical layer 106. As shown, data packet 104g is associated with the physical protocol layer 106 and is sent from the data queue to the physical layer 106. Likewise, data packets 104a through 104c are also only associated with the physical protocol layer 106.

Data packets may travel through various protocols before reaching the physical layer 106. For example, data packet 104f is associated with the virtual circuit (VC) protocol layer 112a, the X.25 protocol layer 110, the LLC2 protocol layer 108a, and the physical protocol layer 106. Likewise data queue 104e is associated with the VC protocol layer 112b, the X.25 protocol layer 110, the LLC2 protocol layer 108a, and the physical protocol layer 106. By way of another example, data packet 104d is only associated with the LLC2 protocol layer 108e and the physical protocol layer 106.

The data queues represent any suitable queuing mechanism for holding data packets at a point above a plurality of protocol layers. For example, the data queues may simply hold the data pending transmission in the order received. In another example, the data queues may control the quality of service provided to data pending transmission by organizing data into a plurality of queues that each assert a claim of dynamic strength on an opportunity to send. The data queues may be associated or located on any suitable type of data transmission device, such as a router device. A router is defined loosely as meaning any network node for receiving and transmitting data packets from and to another network node.

Each of the protocol layers typically communicate with other similar protocol layers (herein referred to as "peer entities") within other network devices. For example, the X.25 protocol layer 110 may communicate with another network device, which communication is represented by a virtual communication bus 114. Actually, the X.25 protocol layer 100 communicates with another peer X.25 protocol layer through the LLC2 protocol layer 108a, the physical protocol layer 106, the peer physical protocol layer, and peer LLC2 protocol layer. Likewise, the LLC2 protocol layers 108a and 108b each communicate with a peer LLC2 protocol layer, which communications are represented by virtual communication lines 116a and 116b, respectively. Physical layer 106 is configured to communicate with other peer physical layers of other network hardware devices through communication line 118.

A protocol context communicates with a peer context on another network node by using its lower layer protocol context(s). The conversation commonly includes control information, as well as the user data that is carried on behalf of the context's own overlying protocol context(s). The context control information is originated and terminated by the contexts, whereas the user data is sent from and received by the user(s) of the protocol context in the network node.

Both the user data and control data are commonly presented as user data to the underlying protocol context. A protocol context may be required to prohibit user data communication (e.g., it is congested) while remaining capable of exchanging control information. Thus, a protocol context may need to determine whether it's underlying protocol context path is capable of sending control information while maintaining its own context congestion status of being unable to accept user data. Any user data already accepted and queued by a protocol context may be considered control information and may be sent while the context remains unable to accept additional user data.

Peer protocol layers from different network devices or nodes typically pass control information back and forth through its lower protocol context(s) or layers. For example, a first node's LLC2 protocol context may transmit control data to a second node's LLC2 protocol context to indicate that the second node LLC2 protocol context should cease packet transmission. Likewise, the first node's LLC2 protocol context may transmit information that indicates that the second node's LLC2 context may resume transmission. Since flow control information is generally time-sensitive, transmission of such flow control information should not be unduly delayed.

Data packets are typically sent to the next protocol layer of an associated protocol stack as soon as the data queue is ready to send and the next protocol layer is ready to accept the data packets. For example, data packet 104e is sent to VC protocol context 112b. The data packet is then sent to the next protocol layer as soon as the current protocol layer is able to send and/or the next protocol level is ready to accept. If the next protocol level (e.g., the X.25 protocol 110) is unable to accept the data packet, the data packet is held within a queue of the protocol context itself. For example, if the X.25 protocol context 110 is unable to accept data packets, data packets are held within a queue of VC protocol context 112b. In sum, data packets are held within each protocol queue until a next protocol context is able to accept them.

Although conventional data packet transmission approaches work well under certain conditions, these approaches have associated disadvantages. For example, since data packets are typically sent to the next protocol level as soon as the next level is able to accept data packets, so-called "time warp" effects may occur. That is, when a particular protocol context transfers a data packet downstream to a next protocol context, the particular protocol context loses control of the data packet. Thus, if the particular protocol context subsequently receives a request from a peer protocol context of another network device to stop transmission, this request cannot be applied to data packets that are already resident within the next protocol context. In sum, from the requesting network device's perspective, the particular protocol context appears to disregard the request to cease transmission since the data packets that were sent prior to the request may be received by the requesting network device after the request is made.

One solution to this problem of apparently disregarding requests is to limit the number of data packets that may be held within the underlying protocol contexts. However, this solution results in different problems. For example, the transmission hardware may be unnecessarily limited to using less than its full capacity for transmitting data packets.

Additionally, parallel processing at a particular protocol level becomes a problem when a particular protocol queue within the protocol layer reaches capacity because, for example, the next protocol layer is unable to accept packets. It then becomes difficult to efficiently execute parallel processes within the protocol layer with the filled protocol queue. For instance, when a particular protocol layer passes a data portion to a process that runs concurrently with the receipt of data packets by the particular protocol layer, it may be difficult to reinsert the parallel process' results into the data stream when the protocol queues are overloaded.

One example of a parallel process is a compression routine. A portion of a data packet accepted by a particular protocol context is passed to a compression algorithm while other data packets are accepted, processed, and stored within the protocol context's queue or sent to the next protocol context. In other words, the data portion is input into the compression algorithm and processed by the algorithm while other data packets are accepted into the protocol queue. The compression algorithm may not be able to output its results when the protocol queue is at or near capacity. Additionally, if traffic is heavy, the compression algorithm may not be able to output its results for a significantly long period of time.

In view of the foregoing, there is a need for improved data packet transmission mechanisms and techniques for efficiently controlling transmission of data packets from a network device's data queues through one of a diverse set of protocol stacks.

SUMMARY OF THE INVENTION

Accordingly, the present invention provides apparatus and methods for controlling transmission of data or data packets from a data queue through an associated protocol stack. In general terms, the present invention provides systems and methods for determining whether the associated protocol stack is ready to accept data packets from the data queue.

In sum, each protocol layer within a particular protocol stack associated with a particular data queue has an associated congestion data structure. Each congestion data structure is configured to indicate whether its associated protocol layer is congested or able to accept and/or send data packets to the next protocol layer. Each associated data structure may be analyzed to determine congestion status prior to sending the data packet through its associated protocol stack.

In one embodiment of the invention, a method for transmitting a packet from a data queue through an associated protocol stack is disclosed. The protocol stack is associated with one or more linked data structures. Each data structure indicates whether an associated protocol context is congested and is associated with a next data structure. It is determined whether a current protocol context in the protocol stack is congested by reference to an associated current data structure. If it is determined that the current protocol context is congested, the packet is held within the data queue. If it is determined that the current protocol context is not congested, it is determined whether there is a next data structure. In one alternative embodiment, it is determined whether there is a next data structure by determining whether the current data structure points to a next data structure. If it is determined that there is not a next data structure, the packet is transmitted through the protocol stack. In an alternative embodiment, the current data structure is a last congested data structure.

In another alternative embodiment, it is further determined whether any protocol contexts in the protocol stack are congested by reference to their associated data structures and by sequentially checking the associated data structures from a top data structure to a bottom data structure. If it is determined that all protocol contexts in the protocol stack are not congested, the packet from the data queue is transmitted through the protocol stack. If it is determined that one of the protocol contexts in the protocol stack is congested, the packet is held within the data queue and checking other protocol contexts for congestion is discontinued.

In another aspect, if it is determined that one of the protocol contexts in the protocol stack is congested, a pointer to the congested protocol context is stored. In yet another aspect, an associated data structure of the congested protocol context is defined as the current data structure after storing the pointer to the congested protocol context. The method is then repeated for the newly defined current data structure.

In an alternative embodiment, a current data structure associated with a current protocol context in the protocol stack is disclosed. The current protocol context is implemented on an accepted data packet before the accepted data packet is sent to a next protocol context in the protocol stack. The data structure includes a congestion indicator that specifies whether the current protocol context is able to accept and send a current data packet to the next protocol context.

In yet another aspect of the invention, a method for generating or modifying linked data structures associated with protocol contexts in the protocol stack is disclosed. A current protocol context is implemented on an accepted data packet before the accepted data packet is sent to a next protocol context in the protocol stack. It is determined whether the current protocol context is able to accept and send the received data packet to the next protocol context, and a current data structure associated with the current protocol context is generated or modified such that a congestion indicator specifies whether the current protocol context is able to accept and send the accepted data packet to the next protocol context.

In a further aspect, a router is disclosed. The router includes a plurality of interfaces arranged to control data communication between the router and other network devices, a data queue arranged to hold one or more data packets, a protocol stack arranged to accept the data packets from the data queue and transmit the data packets to another network device, and a processing unit arranged to implement processes associated with the router. The processing unit is operable to transmit a data packet from a data queue through a protocol stack when it is determined that the protocol stack is uncongested.

In another embodiment of the invention, an operating system software for use by a processor in directing operation of a data transmission system utilizing a data queue and a protocol stack is disclosed. The operating system software includes at least one processor-readable medium and a program mechanism embedded in the at least one processor-readable medium for transmitting a data packet from the data queue through the protocol stack when it is determined that two or more protocol contexts within the protocol stack are not congested.

In another embodiment, a method for transmitting a packet from a top protocol context through the top protocol context's underlying protocol stack is disclosed. The top protocol context is associated with one or more linked data structures, and each data structure indicates whether an associated protocol context is congested and is associated with a next data structure. It is determined whether a current protocol context in the protocol stack is congested by reference to an associated current data structure. If it is determined that the current protocol context is congested, the data is not formed to send through the associated protocol stack. If it is determined that the current protocol context is not congested, it is determined whether there is a next data structure to check for congestion. If it is determined that there is not a next data structure, the data is formed and transmitted through the associated protocol stack.

The present invention has many advantages. For example, the linked data structures and a particular data packet's association with one of these data structure chains allow for efficient traffic management. That is, one or more protocol contexts of a particular data packet's associated protocol stack may be quickly checked for congestion at anytime by analyzing the relevant data structures since the entire associated data structure chain for the protocol stack may be associated with the data packet via pointers, for example.

Additionally, a protocol context can readily reference the congestion data structures to determine if the linked data structures below the context are congested. Thus, the protocol context can determine if it can create and send control information when its underlying services are not congested while maintaining independent congestion information for the users of the context itself. The chain of congestion data structures facilitates the ability of each protocol context to determine the total congestion status of the subset of protocol contexts that underlie it.

Additionally, the more data structures that are checked within an associated data structure chain, the more likely it will be that the protocol stack is uncongested when the data packet is transmitted from the data queue through the protocol stack. Likewise, the amount of queuing at each individual protocol level as a result of congestion in the next protocol context level may be significantly reduced. However, savings in processing time may be achieved by checking only a few data structures within the chain. Data structures may be chosen to increase reliability or decrease processing time of congestion detection. For example, a data structure of a protocol layer that is frequently congested may be included within the check to decrease the likelihood of erroneous determinations that the protocol stack is uncongested. By way of another example, the last congested protocol layer may be efficiently checked at the beginning. Since the last congested protocol context layer is likely to still be congested, this feature allows an efficient check to determine whether it is still congested before other protocol layers are unnecessarily checked.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
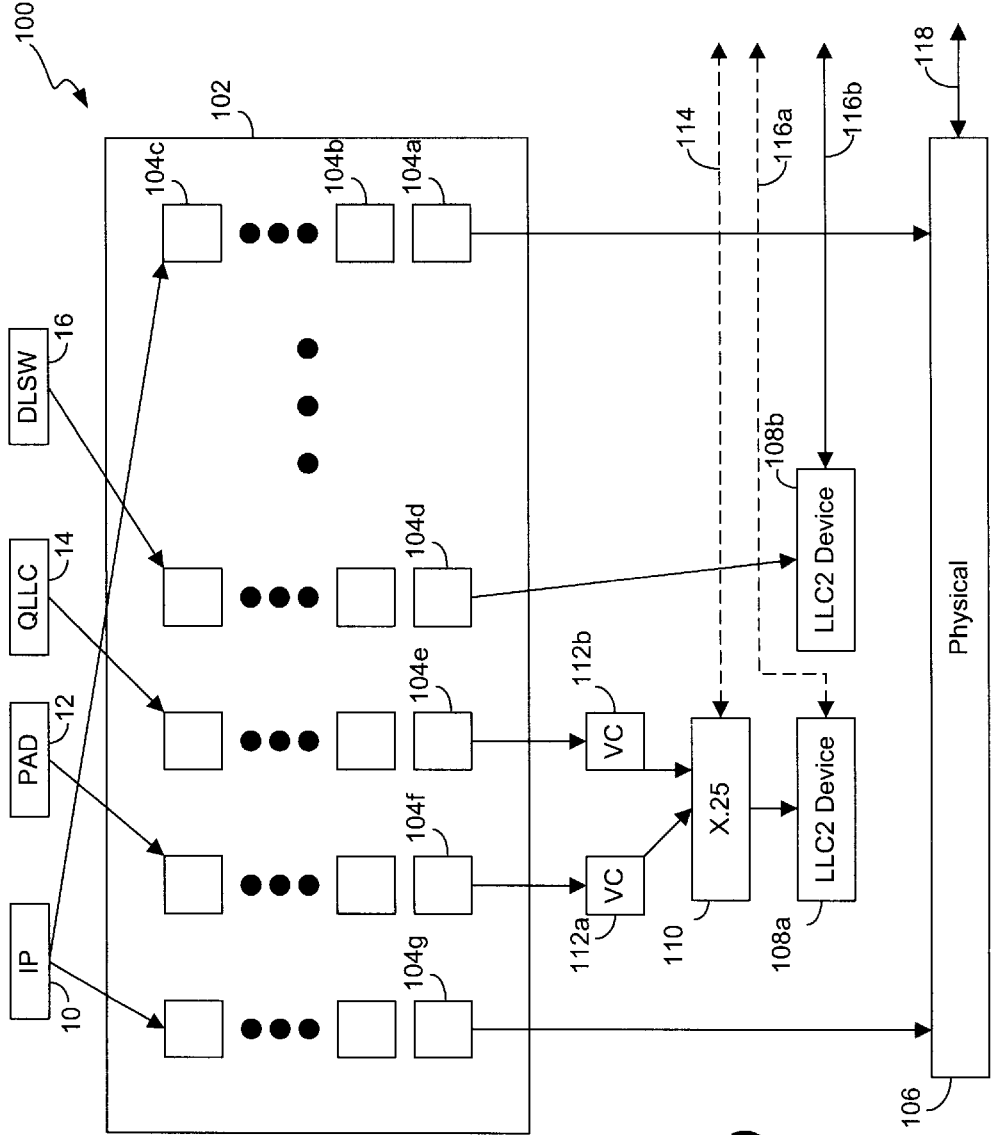
FIG. 1 is a diagrammatic representation of a conventional network configuration.
Figure 2:
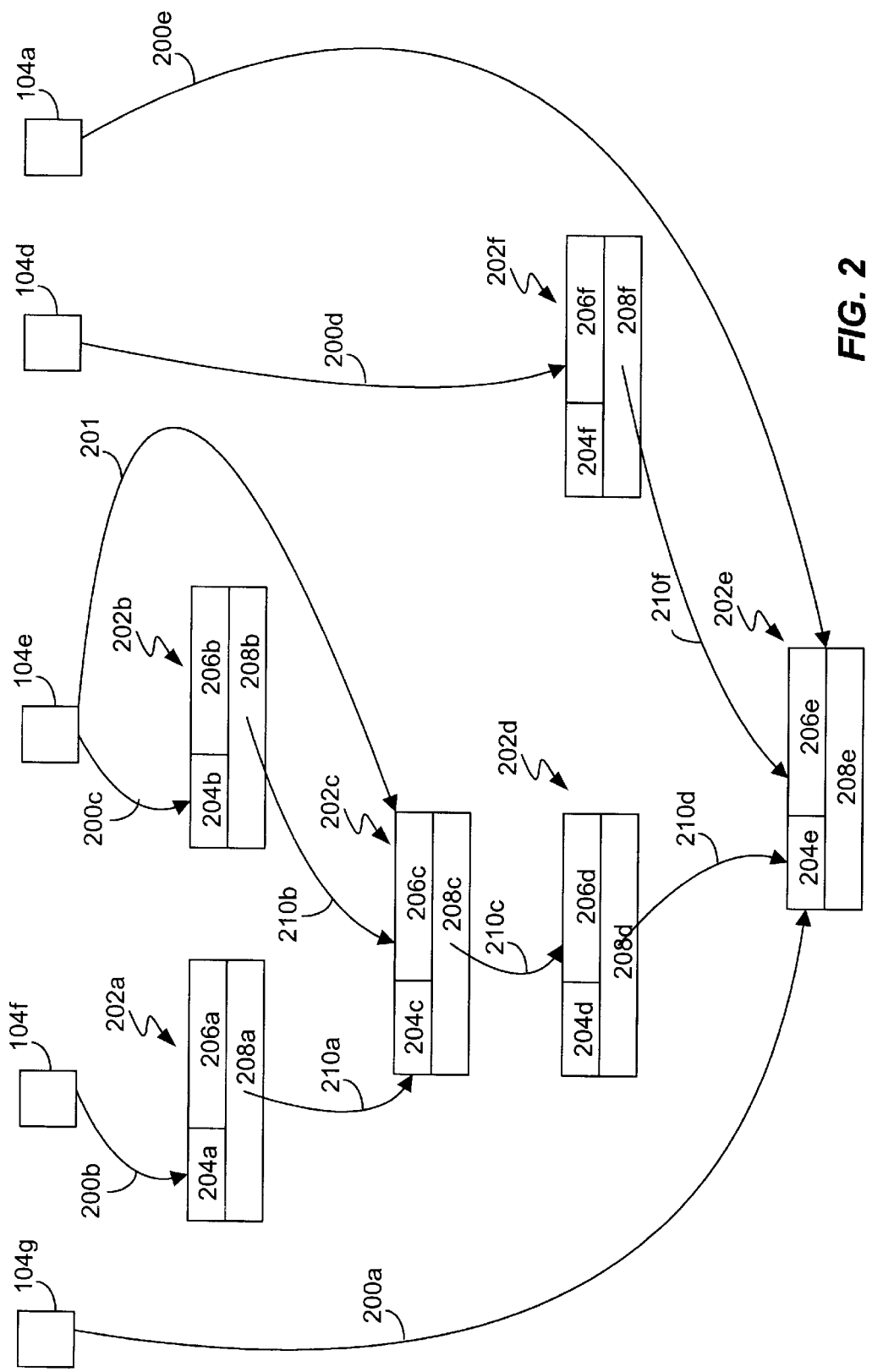
FIG. 2 is a diagrammatic representation of a plurality of linked data structures in accordance with one embodiment of the present invention.

FIG. 2 is a diagrammatic representation of a plurality of linked data structures 202 in accordance with one embodiment of the present invention. Each protocol layer that implements flow control may have an associated data structure 202. In other words, any protocol level that has a congested and a not congested state may have an associated data structure that contains congestion status information. For example, the physical protocol layer (e.g., 106 of FIG. 1) has an associated data structure 202e. Likewise each LLC2 protocol (e.g., 108a and 108b of FIG. 1) has an associated data structure 202d and 202f. A data structure 202c is present for the X.25 protocol layer (e.g., 110 of FIG. 1). Each virtual circuit (VC) (e.g., 112a and 112b of FIG. 1) has an associated data structure 202a and 202b.

In sum, each protocol stack may have an associated data structure chain. That is, each set of protocol layers through which a data packet may travel may have an associated chain of data structures. If a data packet travels from a first protocol layer to a second protocol layer, a first data structure that is associated with the first protocol layer may be linked to a second data structure that is associated with the second protocol layer.

Alternatively, a data structure may be shared by two or more protocol layers within a particular protocol stack. For example, data structure 202d may include congestion status information for protocol layers 112a (VC protocol layer of FIG. 1), 110 (X.25 protocol layer of FIG. 1), as well as for protocol layer 108a (LLC2 protocol layer of FIG. 1). In this embodiment, data structures 202a and 202c are not required.

Data structures may be disassociated and associated with a particular chain of data structures as required by the particular application. For example, data structures 202a and 202b are each generated for a virtual circuit (e.g., 112a and 112b of FIG. 1, respectively). A data structure may be associated with each VC that is generated by the X.25 protocol layer. Likewise, as a particular VC is dismantled, its associated data structure is also eliminated and/or disassociated from the chain of associated data structures. For example, if the VC 112b of FIG. 1 were to be dismantled, the corresponding data structure 202b would also be dismantled or unlinked from the associated data structure chain.

In the illustrated embodiment of FIG. 1, the data packet 104f may travel through protocol layers 112a (VC), 110 (X.25), 108a (LLC2), and 106 (physical). Returning to FIG. 2, the data structure 202a of the VC protocol layer 112a is linked to the data structure 202c of the X.25 protocol layer 110 through pointer 210a. The data structure 202c of the X.25 protocol layer is linked to the data structure 202d of the LLC2 protocol layer 108a through pointer 210c, and the data structure 202d of the LLC2 protocol layer is linked to the data structure 202e of the physical protocol layer 106 through pointer 210d.

A first chain of data structures may merge with another chain of data structures, which merging depends on the particular network configuration and application. For example, the data structure 202b of the VC protocol layer 112b is linked to the same X.25 data structure (202c) as the previously described data structure 202a of the VC protocol layer 112a through pointer 210b. Similarly, the data structure 202f of the LLC2 protocol layer 108b is linked to the same physical protocol layer's data structure 202e as the other chain of data structures through pointer 210f.

Each protocol layer is responsible for generating and modifying its own associated data structure. The protocol layer updates the associated data structure to indicate the protocol layer's current congestion status. That is, each data structure is configured to indicate whether the protocol layer is able to transmit a data packet to a next protocol layer.

The data structure may have any suitable format for indicating congestion status for an associated protocol. As shown, each data structure may include one or more congestion flag(s) 206, a cascade indication flag 204, and a cascade congestion pointer 208. The congestion flag(s) 206 indicate whether the associated protocol is ready to send the data packet to the next protocol layer. For example, the congestion flag may be in the form of a single bit to indicate the congestion status of a single protocol layer. Alternatively, the congestion flags may be in the form of two or more bits that indicate the congestion status of several protocol layers. In other words, as described above a data structure may be shared by two or more protocol layers.

The cascade congestion pointer 208 is configurable to link the data structure to a next associated data structure. A data structure may be present for all or some of the protocol levels within a particular protocol stack through which data packets from an associated queue must travel. Each data structure within a particular protocol stack is linked to another data structure within the same protocol stack thereby forming a chain of linked data structures. Of course, in the case where a data structure is shared by two or more protocol layers, the linked chain of data structures may exclude data structures for some of the protocol layers.

The cascade indication flag 204 indicates whether the cascade congestion pointer 208, in fact, links the data structure to a next data structure. By way of example, the cascade indication flag 204a for data structure 202a will indicate that the cascade congestion pointer 208a contains a pointer 210a to the next data structure 202c. In contrast, the cascade indication flag 204e for data structure 202e will indicate that the cascade congestion pointer 208e does not point to a next data structure since data structure 202e is the last link in the chain.

Since a particular data packet is associated with a particular protocol stack and effectively bound to the top protocol layer through which it must travel, the particular data packet is also necessarily bound to a top data structure of one of the data structure chains that is associated with the associated protocol stack. Each data packet may be associated with the top data structure of its top associated protocol layer in any suitable manner.

As shown, each data packet 104 may include a pointer to the top data structure that is associated with the protocol layer that will initially receive the data packet. More specifically, data packet 104g contains a pointer 200a to data structure 202e of the physical protocol layer 106 since data packet 104g only needs to travel through the physical layer 106. Data packet 104f contains a pointer 200d to the data structure 202a of the VC protocol 112a since the data packet will travel through the VC protocol layer 112a. Likewise data packet 104e contains a pointer 200c to data structure 202b of the VC protocol layer 112b, and data packet 104d contains a pointer 200d to the data structure 202f of the LLC2 protocol layer 108b. Data packet 104a contains a pointer 200e to data structure 202e of the physical layer 106.

Each data packet may also include a pointer to the data structure of the last congested protocol within its associated protocol stack. For example, data packet 104e has a last congested pointer 201 to data structure 202c. This pointer may be generated after it is determined that a particular protocol level is unable to receive or send data packets. One embodiment of a process 301 that implements this feature is further described below with reference to FIG. 3B.

The linked data structures and the data packet's association with one of these data structure chains allow for efficient traffic management. That is, one or more protocol layers of a particular data packet's associated protocol stack may be quickly checked for congestion at anytime by analyzing the relevant data structures since the entire associated data structure chain for the protocol stack is associated with the data packet via pointers, for example.

Thus, before each data packet exits from its data queue, one or more of the associated data structures for the particular data packet may be analyzed to determine whether one or more of the associated protocol layers are congested. Each protocol layer may be analyzed via the associated data structure to determine whether the protocol layer is able to transmit a data packet. For example, before data packet 104g is sent from the data queue, data structure 202e is obtained through pointer 200a and checked to determine whether the physical layer 106 is congested. Since all of the congestion information for a particular protocol layer may be collected into a single data structure, rapid consultation of the associated data structure to determine congestion status of the particular protocol layer is facilitated.

If a data packet is to be sent through more than one protocol, the associated chain of data structures may be checked to determine the congestion status of the entire associated protocol stack. For example, before data packet 104d is sent from the data queue, data structure 202f of the LLC2 protocol layer 108a is first obtained through pointer 200d and analyzed to determine the congestion status of the LLC2 protocol layer 108a. The data structure 202e of the physical protocol layer 106 may then be obtained through pointer 210f of data structure 202f and checked to determine whether the physical protocol layer 106 is congested before sending the data packet through both the LLC2 protocol layer 108a and the physical protocol layer 106. Thus the congestion status of the entire protocol stack for the data packet 104d may be determined by analyzing the chain of associated data structures for the associated protocols.

Figure 3A:
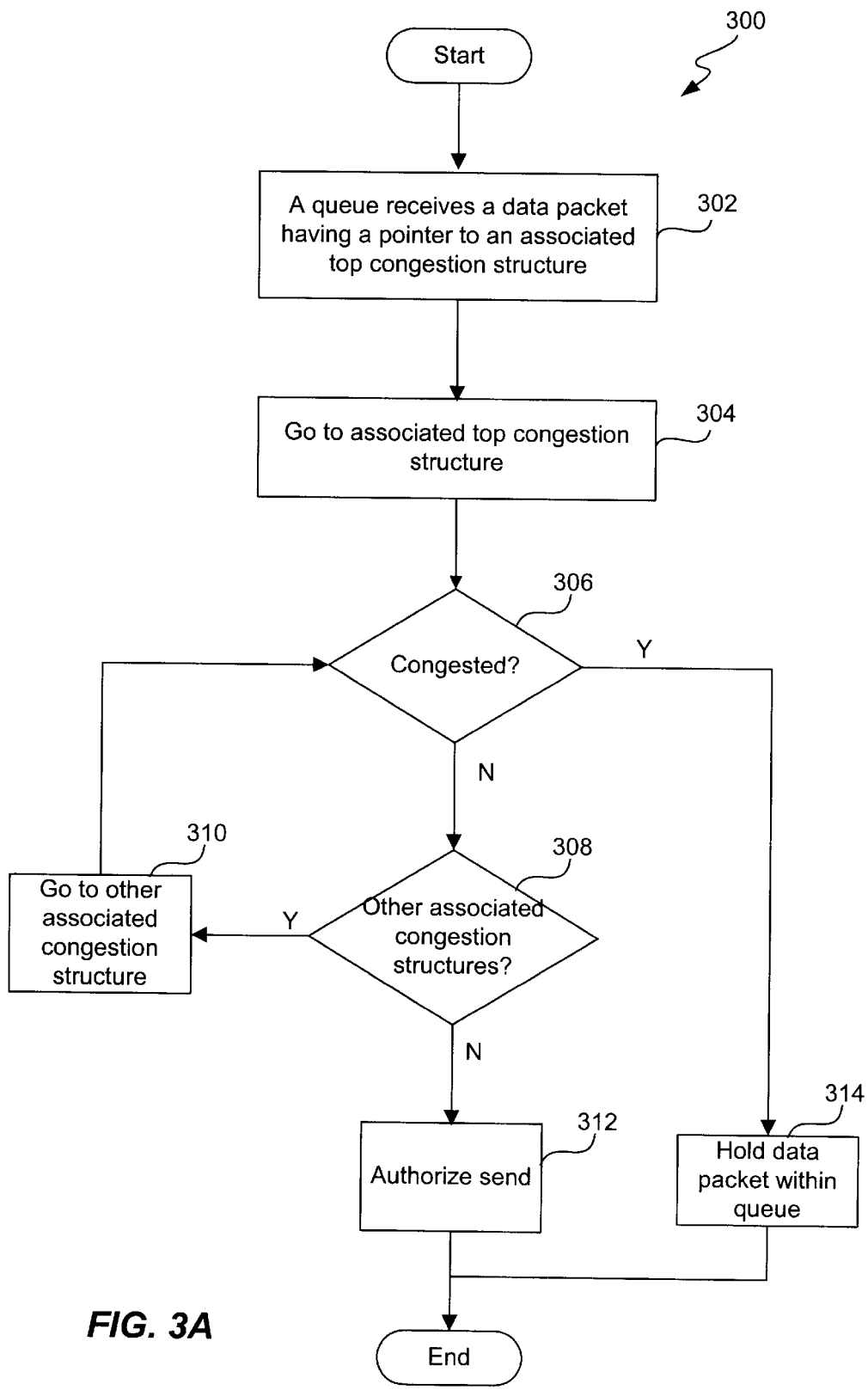
FIG. 3A is a flowchart illustrating a process for determining whether to transmit a data packet from the data queue through an associated protocol stack in accordance with one embodiment of the present invention.

FIG. 3A is a flowchart illustrating a process 300 for determining whether to transmit a data packet from the data queue through an associated protocol stack in accordance with one embodiment of the present invention. Initially, a data queue receives a data packet having a pointer to an associated top congestion data structure in operation 302. The top congestion data structure associated with the protocol stack is then obtained in operation 304. The top congestion data structure is obtained through the data packet's pointer to the associated top congestion structure.

It is then determined whether the associated top congestion structure indicates that the top protocol layer within the protocol stack is congested or unable to send data packets in operation 306. Congestion is determined in any suitable manner, depending on the particular format of the data structures and the requirements of the application used. For example, as described above the data structure may include one or more congestion flag(s) that indicate whether the associated protocol layer is able to send the data packet to the next protocol layer within the protocol stack. The congestion flag(s) of the top protocol layer may then be read to determine whether the top protocol layer of the protocol stack is able to send data packets.

If the top congestion data structure indicates that the top protocol layer is not congested, it is then determined whether there are other congestion structures within the protocol stack that are to be checked for congestion in operation 308. For example, the data packet may have to pass through several protocol layers to reach the physical device, and it may be desired that all of the protocol layers are to be checked for congestion. Hence, prior to sending the data packet from the data queue through its associated protocol stack, each data structure that is associated with each protocol layer through which the data packet must pass may be checked to determine whether each protocol layer is able to send the data packet. Alternatively, a few sample protocol layers may be checked within the protocol stack to quickly approximate congestion status.

If there are other congestion structures to be checked that are associated with the top congestion structure, a next associated congestion structure is obtained in operation 310. The next congestion structure may be any of the other congestion structures within the associated protocol stack. For example, the next structure may be the congestion structure that is directly linked to the top congestion structure, last data structure in the chain, or any structure in between. Additionally, a single data structure may contain congestion status information for more than one protocol level within the associated protocol stack.

The determination of whether there are other congestion structures may be accomplished in any suitable manner. For example, if the current congestion structure includes a cascade indication flag, it may be evaluated to determined whether the current congestion structure is linked to a next congestion structure. If the cascade indication flag indicates that a next congestion structure is present, the next congestion structure is then obtained through the cascade congestion pointer. Alternatively, the current congestion structure's cascade pointer may be evaluated directly without first checking the cascade indication flag (e.g., the current congestion structure may not include a cascade indication flag). That is, it may be determined whether the cascade congestion pointer is valid and points to a next congestion structure.

It is then determined whether the next congestion structure is congested in operation 306. Congestion may be checked in any suitable manner. For example, the data structure's congestion flag(s) may be checked to determine whether they indicate congestion for the associated protocol levels. For example, a value of "0" for all of the congestion flag(s) indicates that the associated protocol levels are presently uncongested, while a value of "1" for any of the flag(s) indicates congestion for one of the associated protocol levels. The layout of the congestion flag(s) and cascade indication flag may be designed to allow an efficient test of all values in one operation.

After the next congestion structure is evaluated, any other remaining associated data structures may be checked to determine if they are able to receive and transmit data packets. For example, all of the data structures within the chain may be sequentially checked for the entire protocol stack.

When there are no more associated congestion structures to check and it is determined that the associated protocols are not congested, the data is authorized for transmission in operation 312, and the data may then be sent from the data queue through the protocol stack. If any of the analyzed congestion data structures indicate that an associated protocol layer is congested in operation 306, the data packet is held within the data queue in operation 314.

When data is held within the data queue (or, alternatively, within a queue of a protocol context) and the congested protocol level uncongests, transmission may be restarted for the held data in any suitable manner. For example, when congestion is relieved for a particular protocol context, the context pulls on its user(s) until either data is dislodged or it is determined that there is no data that needs to be sent. By way of specific example, when the physical protocol layer goes from a congested state to a uncongested state, it may sequentially pull on the users of protocol levels from a lowest level to a highest level. Alternatively, the protocol context may directly pull the data queues above the protocol stacks. Thus, data packets, as well as control information from individual protocol levels, may be sent through the associated protocol stack.

The chain of data structures may be constructed so that the more data structures that are checked within an associated data structure chain, the more likely it will be that the protocol stack is uncongested when the data packet is transmitted from the data queue through the protocol stack. Additionally, the amount of queuing at each individual protocol level as a result of congestion in the next protocol level may be significantly reduced. However, savings in processing time may be achieved by checking only a few data structures within the chain. Data structures may be chosen to increase reliability of congestion detection. For example, a data structure of a protocol layer that is frequently congested may be included towards the beginning of the check to decrease the likelihood lengthy evaluations when the stack is congested. By way another example, if an incomplete check of the congestion structure chain is performed, a check of a frequently congested data structure may decrease the likelihood of erroneous determinations that the protocol stack is uncongested.

Alternatively, the order of checking the data structures within the chain may be altered to increase efficiency of congestion detection. For example, when it is determined that a particular protocol layer is congested, a pointer to the associated data structure may be retained for when the chain of data structures are analyzed again. The retained data structure may then be periodically checked first to determine whether the associated protocol layer has become uncongested.

Although the present invention is described as checking the entire protocol stack for congestion prior to transmitting a particular data packet from the data queue to the physical layer, of course, any number of the associated protocol layers may be checked for congestion. The number of protocol layers that are checked is dependent on the level of reliability and efficiency that is desired or required by the particular application.

Figure 3B:
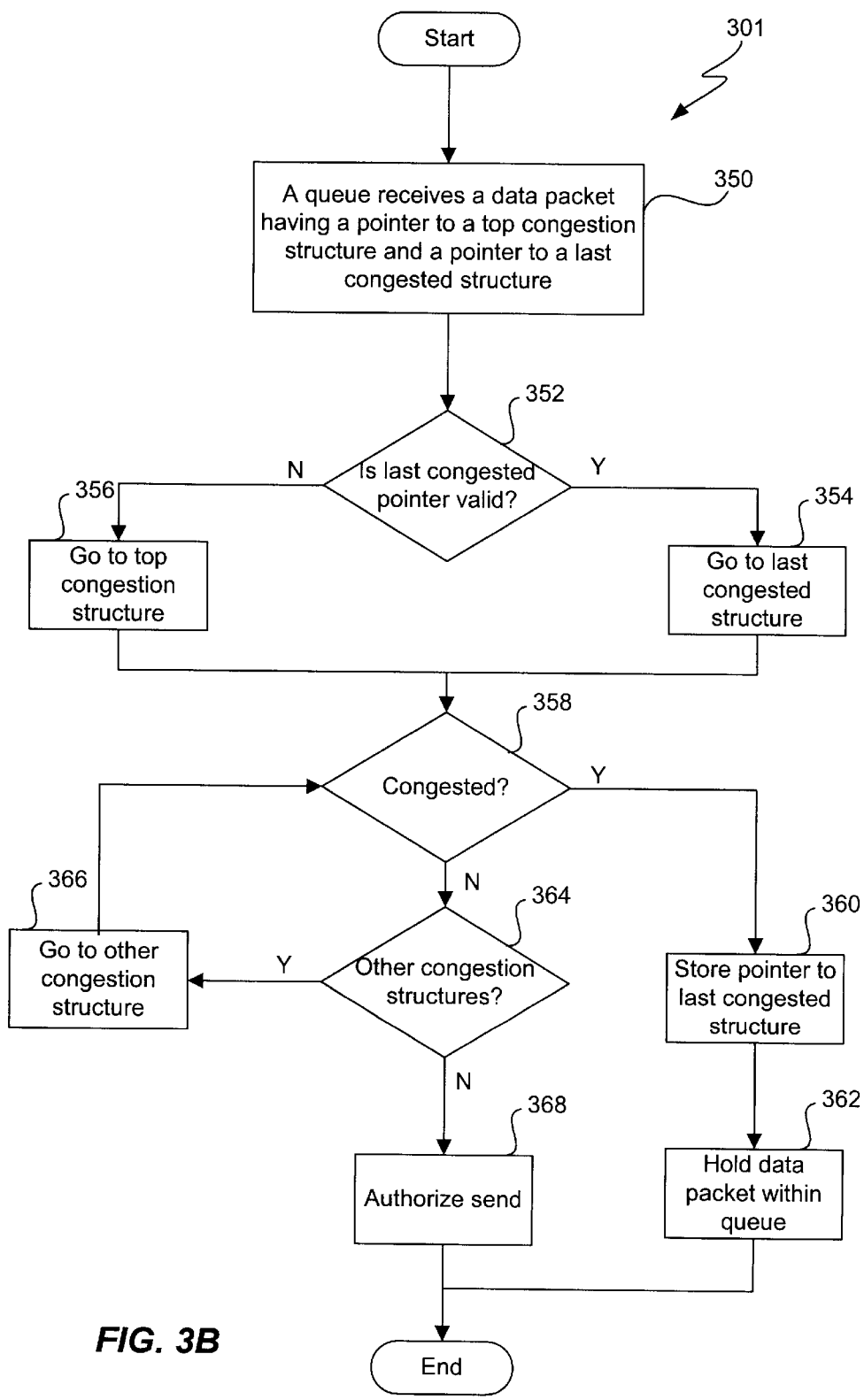
FIG. 3B is a flowchart illustrating a process for determining whether to transmit a data packet from the data queue through an associated protocol stack in accordance with an alternative embodiment of the present invention.

FIG. 3B is a flowchart illustrating a process 301 for determining whether to transmit a data packet from the data queue through an associated protocol stack in accordance with an alternative embodiment of the present invention. Initially, a data queue receives a data packet having a pointer to an associated top congestion data structure and a pointer to a last congested structure in operation 350. It is then determined whether the last congested pointer is valid in operation 352. In other words, it is determined whether a pointer to the data structure for a last congested protocol has been stored for the associated protocol stack.

If it is determined that the last congestion pointer is valid, the last congested data structure in obtained in operation 354. This feature of the present invention allows the last congested protocol layer to be efficiently checked at the beginning. Since the last congested protocol layer is likely to still be congested, this feature allows an efficient check to determine whether it is still congested before other protocol layers are unnecessarily checked. If it is determined that the last congestion pointer is not valid, the top congestion data structure is obtained through the data packet s pointer to the associated top congestion structure in operation 356.

It is then determined whether the obtained data structure indicates that the associated protocol layer (e.g., the top data structure or last congested data structure) within the protocol stack is congested or unable to send data packets in operation 358. Congestion is determined in any suitable manner, depending on the particular format of the data structures and the requirements of the application used. For example, as described above the data structure may include one or more congestion flag(s) that are checked to determine whether the associated protocol layer is able to send the data packet to the next protocol layer within the protocol stack.

If the obtained data structure indicates that the associated protocol layer is not congested, it is then determined whether there are other congestion data structures within the protocol stack to check for congestion in operation 364. If there are other congestion structures to check, a next associated congestion structure is obtained in operation 366.

The next congestion structure may be any congestion structure within the associated protocol stack. For example, it may be the congestion structure that is directly linked to the top or last congestion structure, the last data structure in the chain, or any of the congestion structures in between. Alternatively, if the last congested structure was checked, the next congestion structure may be the top data structure. In one embodiment, the entire chain of data structures is evaluated for congestion from top to bottom after determining that the last congested data structure indicates no congestion for the last congested protocol level.

After the next congestion structure is obtained, it is then determined whether the next congestion structure is congested in operation 358. Likewise, any remaining associated data structures may be checked to determine if they are able to receive and transmit data packets.

When there are no more associated congestion structures to check and it is determined that the checked structures indicate that there is no congestion, the data packet is authorized for sending in operation 368, and may be sent from the data queue through the protocol stack. However, if one of the congestion structures indicates that the associated protocol layer is congested in operation 358, a pointer to the last congested data structure is stored in operation 360. This pointer may be referenced by any data packets that are associated with the particular protocol stack. The data packets are then held within the associated data queue in operation 362. Thus, when the process 301 is implemented again, the data structure of the last congested protocol layer may be obtained in operation 354 and checked first in operation 358 to determine whether it has become uncongested.

Figure 3C:
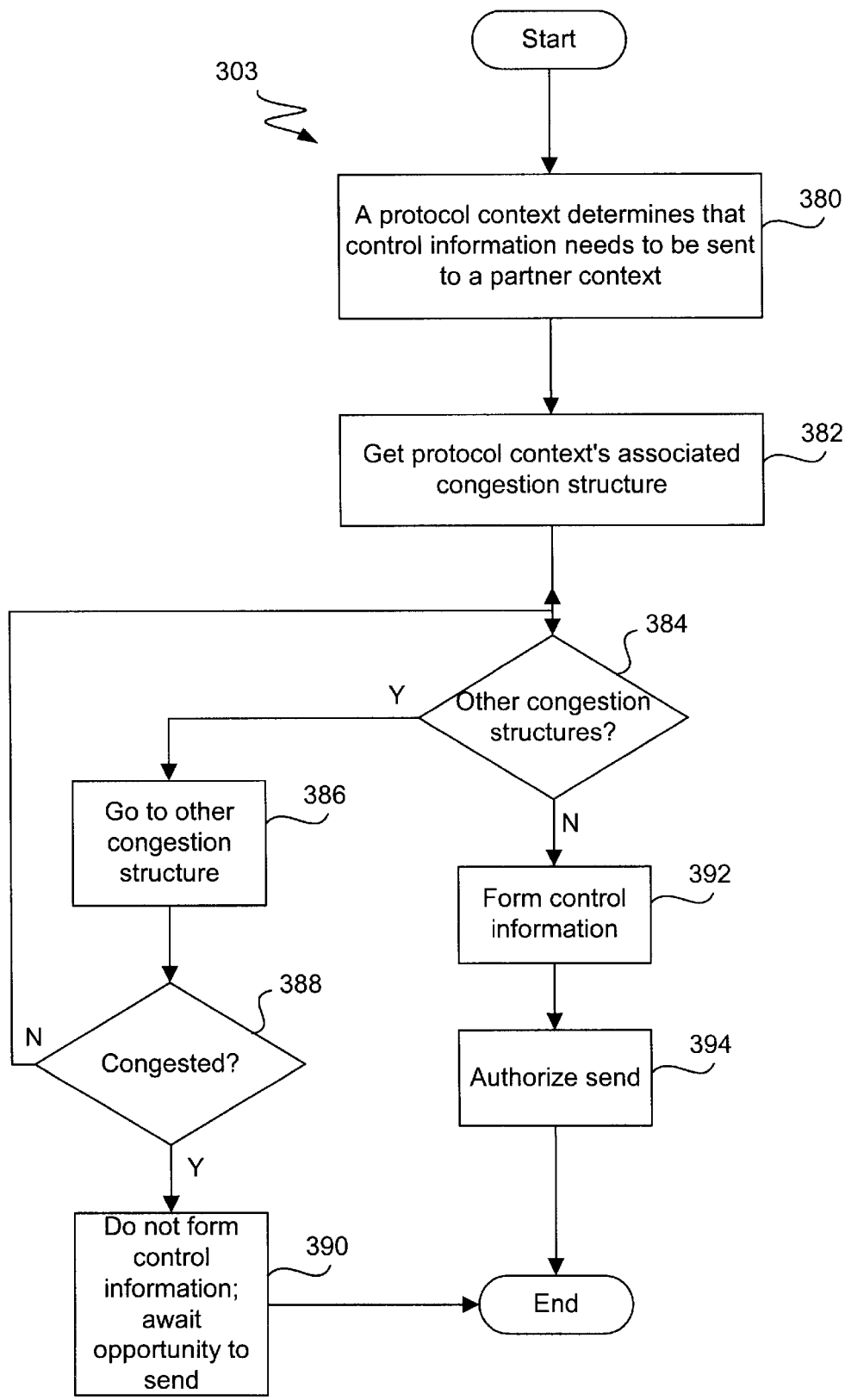
FIG. 3C is a flowchart illustrating a process for determining whether to transmit data from a particular protocol context through its underlying protocol levels in accordance with an alternative embodiment of the present invention.

The techniques of present invention may also be implemented for use by a particular protocol context or layer to determine when it may send data (e.g., control information) through its lower protocol levels to a peer protocol context. FIG. 3C is a flowchart illustrating a process 303 for determining whether to transmit data from a particular protocol context through its underlying protocol levels in accordance with an alternative embodiment of the present invention.

Initially, a protocol context determines that control information needs to be sent to a partner or peer context. For example, an X.25 protocol context may need to send flow control information to a peer X.25 protocol. The protocol context's associated congestion structure is then obtained in operation 382. It is then determined whether any other congestion structures are associated with the currently obtained structure in operation 384. For example, it is determined whether the current structure is linked to a next structure.

If there are other congestion structures, the other structure is then obtained in operation 386, and it is determined whether the obtained structure indicates congestion for the associated protocol level in operation 388. If there is congestion, control information is not formed for sending, and the protocol context that needs to send data awaits an opportunity to send in operation 390.

The protocol context may await an opportunity to send in any suitable manner. For example, the protocol context may set a flag indicating it is ready to send. After the lower protocol levels become uncongested, the waiting protocol context may then receive a pull from the underlying protocol layer and in response to the pull, form and send its control information through its lower protocol levels.

However, if the congestion structure indicates that there is no congestion on the associated protocol level, the process 303 proceeds to operation 384 and it is again determined whether there are any other congestion structures. If it is determined that there are no other congestion structures to evaluate for congestion, the control information is then formed in operation 392.

Control information may be formed in any suitable manner and depends on the protocol level and particular application. By way of examples, the protocol context may need to send a query after expiration of a timer, send a response to a query received from the peer protocol context, or send notification in response to changed conditions (e.g., an operator command).

The techniques of the present invention may be implemented on any suitable type of device that can send information over a resource with limited bandwidth. In other words, the invention is applicable for any device that tracks congestion status, e.g., implements flow control. By way of example, the present invention may be implemented on an internal computer bus that is used to communicate between RAM and other installed devices. In this example, a plurality of protocol contexts having independent flow control conditions are present on such bus. In sum, this invention may be implemented on any data transmission device that utilizes queues for storing data and a plurality of protocol contexts, wherein some of the protocol contexts implement flow control.

Figure 4:
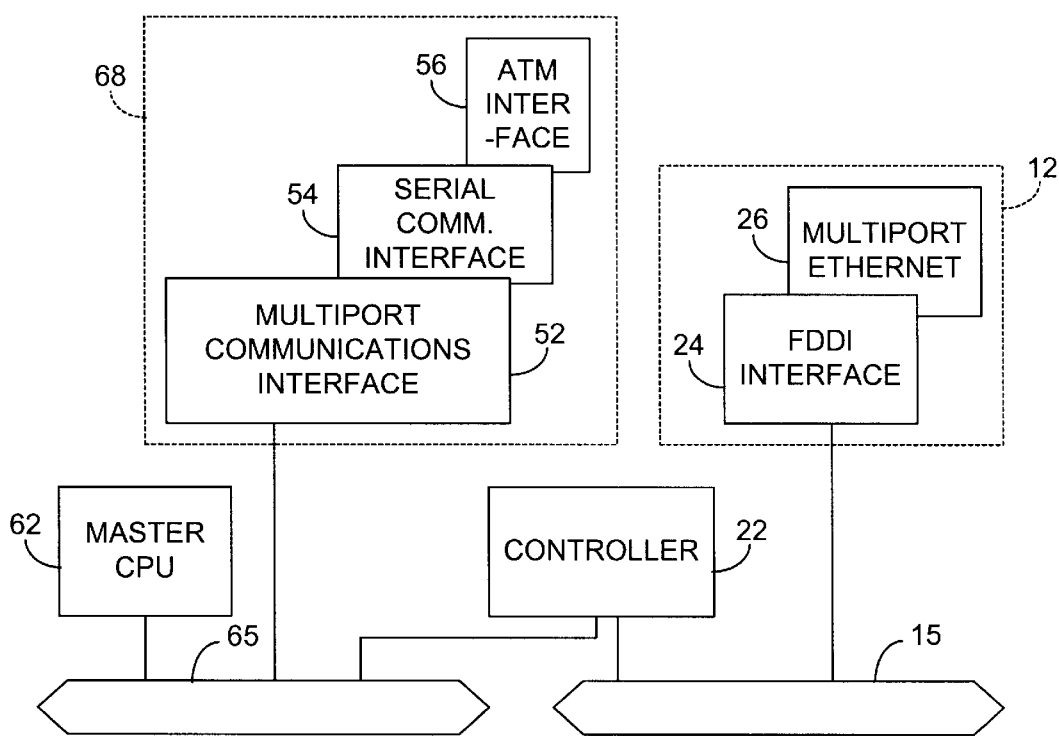
FIG. 4 is a diagrammatic representation of a router in accordance with one embodiment of the present invention.

In one embodiment, the processes 300 and 301 are implemented on a router as shown in FIG. 4. Referring now to FIG. 4, a router 10 of the present invention includes a master central processing unit (CPU) 62, low and medium speed interfaces 68, and high speed interfaces 12. In some embodiments, the CPU 62 is responsible for such router tasks as routing table computations and network management. It may include one or more microprocessor chips selected from complex instruction set computer (CISC) chips, reduced instruction set computer (RISC) chips, or other available chips. In one embodiment, non-volatile RAM and/or ROM also form part of CPU 62. However, there are many different ways in which memory could be coupled to the system. The memory of the router may be configured to include one or more data queues for holding data packets.

The techniques of the present invention may be implemented within software that is stored within memory that is associated with this router system. In one embodiment, operating system software may be implemented for use with the CPU 62 of router 10. The operating system software implements or includes processes 300 and 301 for determining whether to transmit a data packet from the data queue of the router through an associated protocol stack, which operating system software and associated processes 300 and 301 are executed by CPU 62. The operating system software may also implement the various diverse protocols of one or more protocol stacks.

The interfaces 62 and 68 are typically provided as interface cards. Generally, they control the sending and receipt of data packets over the network and sometimes support other peripherals used with the router 10. The low and medium speed interfaces 68 include a multiport communications interface 52, serial communications interface 54, and an a synchronous transfer mode (ATM) interface 56. The high speed interfaces 12 include an FDDI interface 24 and a multiport ethernet interface 26. In one embodiment, each of these interfaces (low/medium and high speed) includes (1) a plurality of ports appropriate for communication with the appropriate media, and (2) an independent processor and in some instances (3) volatile RAM. The independent processors control such communications intensive tasks as packet switching and filtering, and media control and management. By providing separate processors for the communications intensive tasks, this architecture permits the master microprocessor 62 to efficiently perform routing computations, network diagnostics, security functions, etc.

The low and medium speed interfaces are coupled to the master CPU 62 through a data, control, and address bus 65. High speed interfaces 12 are connected to the bus 65 through a fast data, control, and address bus 15 which is in turn connected to a bus controller 22. The bus controller functions are provided by a processor.

Although the present invention is described as being implemented on the router of FIG. 4, this router is by no means the only router architecture on which the present invention can be implemented. For example, an architecture having a single processor that handles communications as well as routing computations, etc. would also be acceptable. Further, other types of interfaces and media could also be used with the router.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, the data packet may be linked to the bottom data structure of the protocol stack, and each data structure may be checked for congestion from the bottom structure to the top structure. By way of another example, the data structures may be linked such that adjacent protocols do not have adjacently linked data structures. That is, the chain of data structures may be associated with a few interspersed protocols within the protocol stack and linked accordingly. Accordingly, the present embodiments are to be considered as illustrative and not restrictive, and the invention is not to be limited to the details given herein, but may be modified within the scope and equivalents of the appended claims.

What is claimed is:

1. A method for transmitting a packet from a data queue through an associated protocol stack wherein the protocol stack is associated with one or more linked data structures, each data structure indicating whether an associated protocol context is congested and is associated with a next data structure, the method comprising:

(a) determining whether a current protocol context in the protocol stack is congested by reference to an associated current data structure;

(b) if it is determined that the current protocol context is congested, holding the packet within the data queue;

(c) if it is determined that the current protocol context is not congested, determining whether there is a next data structure to check for congestion; and (d) if it is determined that there is not a next data structure, transmitting the packet through the protocol stack.

2. A method as recited in claim 1, further comprising if it is determined that there is a next data structure, defining the next data structure as the current data structure and repeating operations (a) through (d).

3. A method as recited in claim 1, wherein it is determined whether there is a next data structure by determining whether the current data structure points to a next data structure.

4. A method as recited in claim 2, wherein the current protocol context and the next protocol context are adjacent to each other without another protocol context being between.

5. A method as recited in claim 3, wherein each data structure further includes a cascade indication flag that indicates whether the current data structure points to a next data structure and the determination of whether the current data structure points to the next data structure is based on the cascade indication flag.

6. A method as recited in claim 1, wherein the protocol stack includes two or more protocol contexts selected from a group consisting a linked logic control protocol context, a X.25 protocol context, and a virtual circuit protocol context.

7. A method as recited in claim 1, further comprising:
determining whether any protocol contexts in the protocol stack are congested by reference to their associated data structures and by sequentially checking the associated data structures from a top data structure to a bottom data structure;
if it is determined that all protocol contexts in the protocol stack are not congested, transmitting the packet from the data queue through the protocol stack; and
if it is determined that one of the protocol contexts in the protocol stack is congested, holding the packet within the data queue and discontinuing with checking other protocol contexts for congestion.

8. A method as recited in claim 7, further comprising if it is determined that one of the protocol contexts in the protocol stack is congested, storing a pointer to the congested protocol context.

9. A method as recited in claim 8, further comprising after storing the pointer to the congested protocol context, defining an associated data structure of the congested protocol context as the current data structure and repeating operations (a) through (d).

10. A method as recited in claim 8, further comprising:
if it is determined that the current data structure is associated with a next data structure, defining the next data structure as the current data structure and repeating operations (a) through (d); and
if it is determined there is not a next data structure, defining a top data structure as the current data structure and repeating operation (a) through (d).

11. A method as recited in claim 1, wherein the current data structure is a last congested data structure.

12. A method as recited in claim 1, wherein the data queue is associated with a protocol layer of the protocol stack.

13. In a data transmission system utilizing a data queue and a protocol stack, a computer readable medium encoded with a current data structure mapped correspondingly to a current protocol context in the protocol stack, the current protocol context being implemented on an accepted data packet before the accepted data packet is sent to a next protocol context in the protocol stack, the data structure comprising a congestion indicator that specifies whether the current protocol context is able to accept and send a current data packet to the next protocol context, wherein the congestion indicator contains a congestion flag that has a first state that specifies that the current protocol context is able to accept and send the current data packet and a second state that specifies that current protocol context is usable to accept and send the current data packet and a cascade congestion pointer that may be used to point to a next data structure associated with the next protocol context.

14. A data structure as recited in claim 13, wherein the current protocol context implements flow control that is used to set a congestion value for the congestion indicator that specifies whether the protocol context is able to accept and send the current data packet.

15. A data structure as recited in claim 13 further comprising a cascade indication flag that specifies whether the cascade congestion pointer points to a next data structure associated with the next protocol context.

16. A data structure as recited in claim 13 further comprising a cascade indication flag that specifies whether the current data structure points to a next data structure associated with the next protocol context.

17. A data structure as recited in claim 13, wherein the congestion indicator contains a plurality of congestion flags that have a plurality of states that specify various types of congestion or uncongestion.

18. A data structure as recited in claim 17, wherein a first state indicates that processing resources of the current protocol context are overloaded and a second state indicates that the current protocol context is busy transmitting control data.

19. In data transmission system utilizing a data queue and a protocol stack, a method for generating or modifying linked data structures mapped to corresponding protocol contexts in the protocol stack, a current protocol context being implemented on an accepted data packet before the accepted data packet is sent to a next protocol context in the protocol stack, the method comprising:
determining whether the current protocol context is able to accept and send the accepted data packet to the next protocol context;
generating or modifying a current data structure associated with the current protocol context such than a congestion indicator specifies whether the current protocol context is able to accept and send the accepted data packet to the next protocol context;
determining whether the next protocol context is able to accept and send the received data packet to the next protocol context; and
generating or modifying a next data structure associated with the next protocol context such that a next congestion indicator specifies whether the next protocol context is able to accept and send the accepted data packet to the next protocol context.

20. A method as recited in claim 19, further comprising unlinking the current data structure from the linked data structures when the current protocol context is dismantled.

21. A method for transmitting a packet from a top protocol context through the top protocol context's underlying protocol stack wherein the top protocol context is associated with one or more linked data structures, each data structure indicating whether an associated protocol context is congested and is associated with a next data structure, the method comprising:

(a) determining whether a current protocol context in the protocol stack is congested by reference to an associated current data structure;

(b) if it is determined that the current protocol context is congested, not forming the data to send through the associated protocol stack;

(c) if it is determined that the current protocol context is not congested, determining whether there is a next data structure to check for congestion; and (d) if it is determined that there is not a next data structure, forming and transmitting the data through the associated protocol stack.

22. A method as recited in claim 21, further comprising if it is determined that there is a next data structure, defining the next data structure as the current data structure and repeating operations (a) through (d).

23. A method as recited in claim 22, wherein the current protocol context and the next protocol context are adjacent to each other without another protocol context being between.

24. A method as recited in claim 21, wherein it is determined whether there is a next data structure by determining whether the current data structure points to a next data structure.

25. A method as recited in claim 24, wherein each data structure further includes a cascade indication flag that indicates whether the current data structure points to a next data structure and the determination of whether the current data structure points to the next data structure is based on the cascade indication flag.

26. A computer readable medium containing program instructions for transmitting a packet from a data queue through an associated protocol stack wherein the protocol stack is associated with one or more linked data structures, each data structure indicating whether an associated protocol context is congested and is associated with a next data structure, the computer readable medium comprising:

(a) computer readable code for determining whether a current protocol context in the protocol stack is congested by reference to an associated current data structure;

(b) computer readable code for holding the packet within the data queue if it is determined that the current protocol context is congested;

(c) computer readable code for determining whether there is a next data structure to check for congestion if it is determined that the current protocol context is not congested;

(d) computer readable code for transmitting the packet through the protocol stack if it is determined that there is not a next data structure; and (e) a computer readable medium that stores the computer codes.

27. A computer readable medium as recited in claim 26, further comprising computer readable code for defining the next data structure as the current data structure and repeating the computer readable codes (a) through (d) if it is determined chat there is a next data structure.

28. A computer readable medium as recited in claim 26, wherein it is determined whether there is a next data structure by determining whether the current data structure points to a next data structure.

29. A computer readable medium as recited in claim 26, further comprising:

computer readable code for determining whether any protocol contexts in the protocol stack are congested by reference to their associated data structures and by sequentially checking the associated data structures from a top data structure to a bottom data structure;

computer readable code for transmitting the packet from the data queue through the protocol stack if it is determined that all protocol contexts in the protocol stack are not congested; and computer readable code for holding the packet within the data queue and discontinuing with checking other protocol contexts for congestion if it is determined that one of the protocol contexts in the protocol stack is congested.

30. A computer readable medium as recited in claim 29, further comprising computer readable code for storing a pointer to the congested protocol context if it is determined that one of the protocol contexts in the protocol stack is congested.

31. A computer readable medium as recited in claim 30, further comprising computer readable code for defining an associated data structure of the congested protocol context as the current data structure and repeating the computer readable codes (a) through (d) after storing the pointer to the congested protocol context.

32. A computer readable medium as recited in claim 31, further comprising:

computer readable code for defining the next data structure as the current data structure and repeating the computer readable codes (a) through (d) if it is determined that the current data structure is associated with a next data structure; and computer readable code for defining a top data structure as the current data structure and repeating computer readable codes (a) through (d) if it is determined there is not a next data structure.

33. A computer readable medium as recited in claim 26, wherein the current data structure is a last congested data structure.

34. A computer readable medium containing program instructions for generating or modifying linked data structures mapped to corresponding protocol contexts in a protocol stack, a current protocol context being implemented on an accepted data packet before the accepted data packet is sent to a next protocol context in the protocol stack, the computer readable medium comprising:

computer readable code for determining whether the current protocol context is able to accept and send the accepted data packet to the next protocol context;

computer readable code for generating or modifying a current data structure mapped correspondingly to the current protocol context such that a congestion indicator specifies whether the current protocol context is able to accept and send the accepted data packet to the next protocol context;

computer readable code for determining whether the next protocol context is able to accept and send the received data packet to the next protocol context; and computer readable code for generating or modifying a next data structure associated with the next protocol context such that a next congestion indicator specifies whether the next protocol context is able to accept and send the accepted data packet to the next protocol context; and a computer readable medium that stores the computer codes.

35. A computer readable medium as recited in claim 34, further comprising computer readable code for unlinking the current data structure from the linked data structures when the current protocol context is dismantled.

36. A computer readable medium containing program instructions for transmitting a packet from a top protocol context through the top protocol context's underlying protocol stack wherein the top protocol context is associated with one or more linked data structures, each data structure indicating whether an associated protocol context is congested and is associated with a next data structure, the computer readable medium comprising:

(a) computer readable code for determining whether a current protocol context in the protocol stack is congested by reference to an associated current data structure;

(b) computer readable code for not forming the data to send through the associated protocol stack if it is determined that the current protocol context is congested;

(c) computer readable code for determining whether there is a next data structure to check for congestion if it is determined that the current protocol context is not congested;

(d) computer readable code for forming and transmitting the data through the associated protocol stack if it is determined that there is not a next data structure; and (e) a computer readable medium that stores the computer codes.

37. A computer readable medium as recited in claim 36, further comprising computer readable code for defining the next data structure as the current data structure and repeating computer readable codes (a) through (d) if it is determined that there is a next data structure.

38. A computer readable medium as recited in claim 36, wherein it is determined whether there is a next data structure by determining whether the current data structure points to a next data structure.

39. A computer readable medium as recited in claim 37, wherein the current protocol context and the next protocol context are adjacent to each other without another protocol context being between.

40. A method as recited in claim 38, wherein each data structure further includes a cascade indication flag that indicates whether the current data structure points to a next data structure and the determination of whether the current data structure points to the next data structure is based on the cascade indication flag.

* * * * *